US 6,687,064 B1

(12) United States Patent
Jiang et al.

(10) Patent No.: US 6,687,064 B1
(45) Date of Patent: Feb. 3, 2004

(54) WRITE HEAD FAULT DETECTION CIRCUIT AND METHOD

(75) Inventors: Hong Jiang, Plano, TX (US); Paul Merle Emerson, Murphy, TX (US)

(73) Assignee: Texas Instruments Incorporated, Dallas, TX (US)

( * ) Notice: Subject to any disclaimer, the term of this patent is extended or adjusted under 35 U.S.C. 154(b) by 733 days.

(21) Appl. No.: 09/621,107

(22) Filed: Jul. 21, 2000

(51) Int. Cl.$^7$ ................................................. G11B 5/09
(52) U.S. Cl. .............................. 360/31; 360/68; 360/46; 369/53.42; 340/652
(58) Field of Search .............................. 360/31, 67, 46, 360/53, 68; 324/210, 212, 226, 609, 610, 522, 523, 509, 500, 537, 546, 525; 369/53, 42, 38; 340/635, 652, 653

(56) References Cited

U.S. PATENT DOCUMENTS

| | | | | |
|---|---|---|---|---|
| 4,203,137 A | * | 5/1980 | Beck et al. .................... | 360/31 |
| 5,087,884 A | * | 2/1992 | Brannon ....................... | 324/523 |
| 5,457,391 A | * | 10/1995 | Shimizu et al. ............. | 324/546 |
| 6,104,199 A | * | 8/2000 | Sako .......................... | 324/546 |

* cited by examiner

Primary Examiner—Alan T. Faber
(74) Attorney, Agent, or Firm—W. Daniel Swayze, Jr.; W. James Brady; Frederick J. Telecky, Jr.

(57) ABSTRACT

A circuit (30, 40) and method for detecting faults of a write head (18) of a hard-disk drive system (70). A first resistor $R_1$ and a second resistor $R_2$ are coupled to coil L of write head (18). A transistor $Q_1$ is coupled to a common node of resistor $R_1$ and $R_2$. Current $I_0$ is applied to the coil L, and voltages $V_{ab}$ and $V_{ac}$ across the nodes at either end of resistors $R_1$ and $R_1$ are analyzed in order to detect faults on write head coil L. The detection is performed during a quiet mode of the hard-disk drive system (70), so the fault detection is frequency-independent. Open faults are distinguishable from short-to-ground faults by the write fault detection circuit (30, 40).

21 Claims, 4 Drawing Sheets

WRITE HEAD FAULT DETECTION CIRCUIT AND METHOD

TECHNICAL FIELD OF THE INVENTION

The present invention generally relates to the field of information storage, and more particularly to a circuit and method for detecting faults on a write head of a hard-disk drive.

BACKGROUND OF THE INVENTION

Hard-disk drives are mass storage devices that may include a magnetic storage media, e.g., rotating disk or platters, a spindle motor, read/write heads, an actuator, a preamplifier, a read channel, a write channel, a servo circuit and control circuitry to control the operation of the hard-disk drive and to properly interface the hard-disk drive to a host system or bus. FIG. 1 shows an example of a prior art disk drive mass storage system 10. Disk drive system 10 includes a number of rotating platters 12 mounted on a base. Platters 12 are used to store data that is represented as magnetic transitions on the magnetic platters 12, with each platter 12 coupleable to an arm 14 having a read head 16 and a write head 18 at the tip thereof. The read head 16 and write head 18 are adapted to transfer data to and from the platters 12 via a preamplifier 20. The preamplifier 20 is coupled to circuitry 22 that processes the data being read from and written to platters 12 and controls the various operations of disk drive system 10.

Data is stored to and retrieved from each side of magnetic platters by write heads 18 and read heads 16, respectively, at the tip of arms 14. The read heads 16 comprise magneto-resistive heads adapted to read data from platters 12 when current is passed through them. The write heads 18 comprise inductive wires (coils) that transmit data to magnetic media platters 12. Heads 16, 18 are coupled to preamplifier 20 that serves as an interface between read/write heads 16/18 of disk drive system 10 and circuitry 22. The preamp 20 may comprise a single chip containing a reader amplifier, a writer circuit, fault detection circuitry, and a serial port interface, for example.

The write head 18 comprises a coil through which current is passed to create a magnetic field and write data onto platters 12. A problem in hard-disk drive systems 10 is that the write head 18 coil may be open or short at various times during manufacturing or in the field for a variety of reasons. The open or short faults may occur due to a faulty coil that has severed, creating an open circuit, or a faulty coil that has fused together, creating a short circuit. If the hard-disk drive is moved, the vibration may cause the write head coil to temporarily short to ground, for example. In any of these situations, the write head fault needs to be reported immediately, for example, from preamplifier 20 to circuitry 22. If the write head 18 coil is permanently damaged, it needs to be repaired or replaced. Furthermore, the electrical resistance of the write head 18 coil may be too high to function properly.

Because these faults in the write head 18 coil can occur, a hard-disk drive system 10 requires a function to detect write head 18 faults. Prior art write fault detection methods typically are performed during the write mode, a very noisy mode. Typically, a hard-disk drive system 10 has two active operating modes: a read mode during which data is read from platters 12 via read heads 16, and a write mode, during which write heads 18 write data to platters 12. The ream-plifier 20 includes control circuitry for both the read head 16 and the write head 18. Therefore, it has two exclusive active operation modes: read and write. The read mode is a more passive, quiet and steady mode, and the write mode is more of an active mode, because a large amount of current (usually around 30 to 70 mA), with the current polarity being switched frequently, for example, every 1 or 2 nanoseconds, is passed through the coil in order to write data to platters 12.

During the write mode, the preamplifier 20 provides a substantial current to write head 18 coil to create a magnetic field that writes data to the platters 12. More recent designs of hard-disk drive systems 10 have higher data rates such as 1 gigabits per second, and the write current has to switch direction or polarity faster, accordingly. This results in a complicated write signal waveform, making it difficult to detect write head faults correctly. For example, when the write head is operating normally at high data rate, prior art methods of detecting write head faults may give a false detection and indicate that the write head has an open fault or short to ground. Alternatively, write head faults may not be detected with prior art detection circuits and methods due to their limited frequency range for correct operation.

SUMMARY OF THE INVENTION

The present invention provides an accurate circuit and method for detecting write head faults in a disk drive circuit. The fault detection is performed during a read mode using a small DC current, avoiding problems that arise when performing a write head fault detection during the write mode of a hard-disk drive. Several devices that may be pre-existing in a writer circuit are used to build the present DC detection circuit, which provides reliable and accurate write fault detection while minimizing the circuit overhead needed to perform the write head fault detection function. A first and second serially connected resistor having equal values are coupled across the coil of the write head, with a transistor coupled to a common node between the two resistors and ground to maintain a DC current path to ground. The voltages across the two resistors and with respect to the common node are analyzed to determine the fault status of the write head coil.

Disclosed is a circuit for detecting faults on a write head of a hard-disk drive. The circuit includes a first resistor coupled to a first end of the write head coil at a node a, and a second resistor coupled to a second end of the coil at a node b. A transistor is coupled to the first and second resistors at a common node c. Faults on the write head coil are detectable by analyzing the voltages across the nodes a, b and c.

Also disclosed is a method of detecting faults on a write head of a hard-disk drive. The method comprises the steps of coupling a first end of the write head coil to a first resistor at a node a, coupling a second end of the coil to a second resistor at a node b, and coupling a transistor to the first and second resistors at a common node c. Faults are detected on the coil by analyzing the voltages across nodes a, b and c.

The present invention provides a reliable, accurate means of detecting faults on a write head of a disk drive system by performing a write head fault detection during a quiet operating mode of the hard-disk drive. Errors in write head fault detection are avoided by use of the present invention. Standard components are utilized that are inexpensive and easily implementable into electronic circuitry. The invention is advantageous in discriminating between an open or short fault, which is not possible with prior art fault detection circuits. The write head fault detection is frequency-independent because the detection is performed during a non-writing mode. Transient faults with short duration (<150 nanoseconds) are ignored by means of a timing delay.

BRIEF DESCRIPTION OF THE DRAWINGS

In the drawings, which form an integral part of the specification and are to be read in conjunction therewith.

Like numerals and symbols are employed in different figures to designate similar components in various views unless otherwise indicated.

DETAILED DESCRIPTION OF PREFERRED EMBODIMENTS

Figure 1:
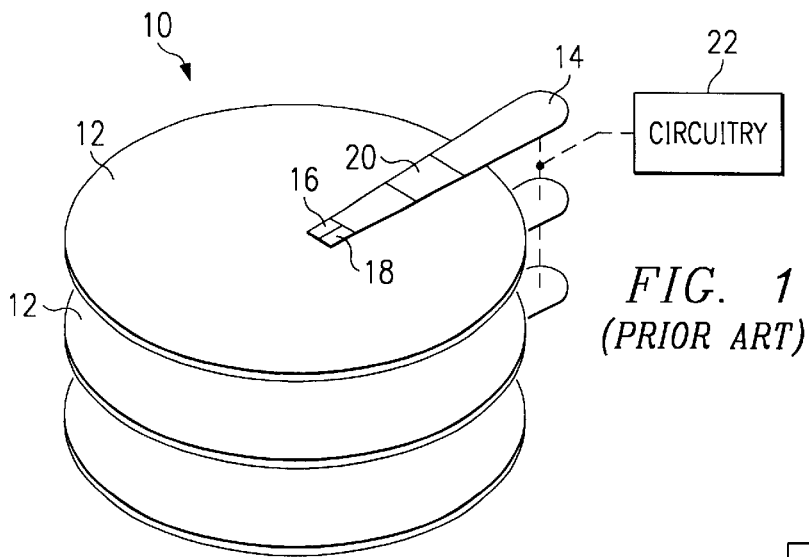
FIG. 1 illustrates a hard-disk drive system of the prior art.
Figure 2:
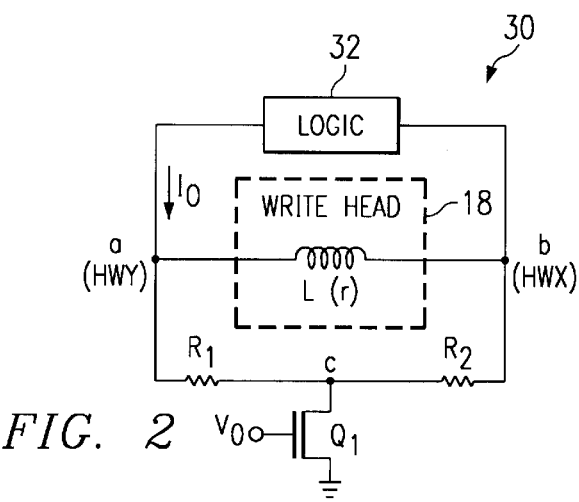
FIG. 2 is a schematic diagram of an exemplary embodiment of the best mode of the write head fault detection circuit of the present invention.

FIG. 2 illustrates an exemplary embodiment of the best mode of the present invention. Write head fault detection circuit 30 comprises a first resistor $R_1$ coupled to coil L of a write head 18 of a hard-disk drive system at a node a. A second resistor $R_2$ of equal value to $R_1$ is coupled to the other end of coil L at node b. Resistors $R_1$ and $R_2$ are coupled together at a common node c. Node c is also coupled to a switch shown as the source of MOS transistor $Q_1$, but which may also comprise a low-power Schottky BJT transistor, for example. The gate of transistor $Q_1$ is coupled to control logic voltage $V_0$ and the source/emitter of transistor $Q_1$ coupled to ground. Node c is coupled to ground via transistor Q1. Transistor Q1 coupled between ground and the common node c of resistors $R_1$ and $R_2$ maintains a DC current path to ground. Coil L is characterized by a relatively small resistance r for the purposes of discussion rather than by an inductance because a DC current is used to detect faults on the coil in accordance with the invention.

During a quiet mode of a hard-disk drive system such as the read mode, an initial DC current $I_0$, preferably less than 0.5 mA is input into node A. Because the resistance r of the coil L is substantially small with respect to the resistance of resistors $R_1$ and $R_2$ ($R_2=R_1>>r$), when the coil L is normal (has no faults), the current that flows through each of resistors $R_1$ and $R_2$ is approximately $0.5I_0$. Analyzing the voltages across the various nodes of the write head fault detection circuit 30 results in the following equations:

Eq. 1:

$$V_{ab} = V_{ac} - V_{bc} = V_{ac} - \frac{V_{ac}}{r+R} * R = V_{ac}\frac{r}{r+R} = \frac{V_{ac}}{1+\frac{R}{r}}$$

$$V_{ac} = I_0 * [R // (R+r)] = I_0 * \frac{R(R+r)}{R+R+r}$$

Eq. 2:

$$V_{ab} = V_{ac} * \frac{r}{r+R} = I_0 * \frac{Rr}{2R+1} = I_0 * \frac{r}{2+\frac{2}{R}} = \begin{Bmatrix} \frac{1}{2}I_0r & (r \ll R) \\ I_0R & (r \gg R) \end{Bmatrix}$$

$V_{ab}=V_{ac}-V_{bc}=V_{ac}V_{ac}/r+R*=V_{ac}/1R/r$ $V_{ac}=I_0*[R//R+r)]=I_0*R(R+r)/R+R+r$ Eq. 1:

$V_{ab}=V_{ac}*r/r+R=I_0*Rr/2R+r=I_0r2r/R=\{½I_0r(r<<R)\}\{I_0R(r>>R)\}$ Eq. 2:

where $R=R_1=R_2$. The detected voltage $V_{ab}$ across nodes a and b is equal to $½I_0r$ when the coil resistance r is much less than resistance R, indicating that the coil is normal (e.g. has no faults). The detected Voltage $V_{ab}$ is equal to $I_0R$ when coil resistance r is much greater than resistance R, indicating an open fault in the coil L of the write head 18.

Figure 3:
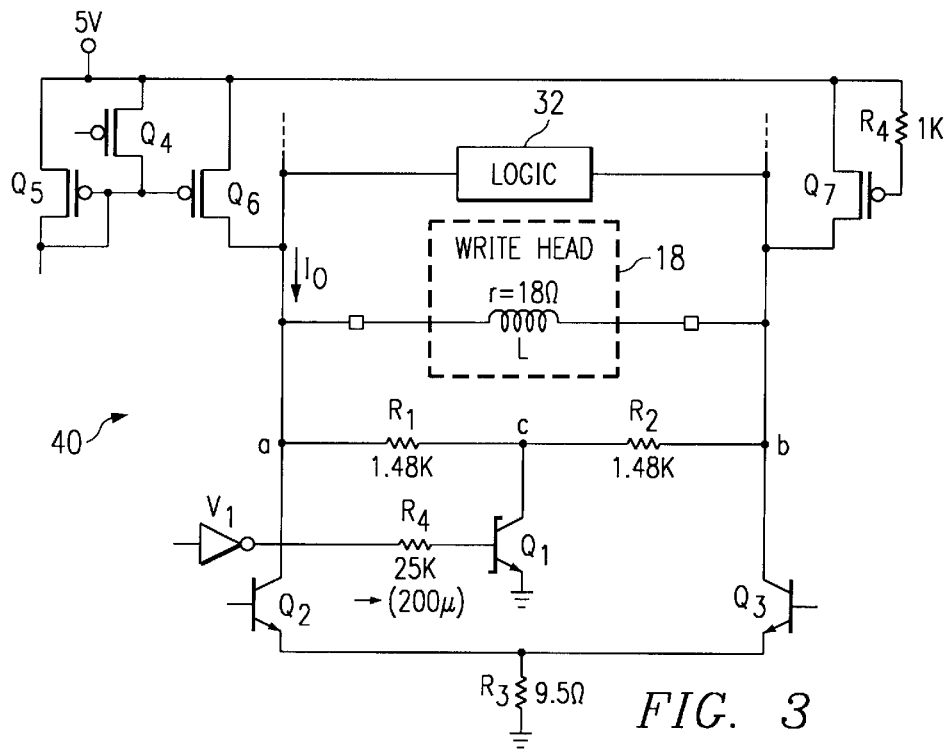
FIG. 3 illustrates schematic of the invention with exemplary current, voltage and resistance values.

FIG. 3 shows a schematic diagram with specific values indicated for the components of the write head fault detection circuit 30 and additional components $Q_2$, $Q_3$, $Q_4$, $Q_5$, $Q_6$, $Q_7$, $R_3$, $R_4$ and $V_1$ coupled to $Q_1$, $R_1$, $R_2$ and write head coil L as shown. In this embodiment, $R_1=R_2=1.48$ KΩ, $r\sim18$ Ω, $I_o$ is approximately less than or equal to 0.5 mA, and control logic voltage $V_o=5V$. Simulation results of the voltages $V_{ab}$ across nodes a and b, and $V_{ac}$ calculated across nodes a and c with these resistor and current values are indicated in the following table:

TABLE 1

| Write head status | $V_{yx}$ ($V_{ab}$) | $V_{yz}$ ($V_{ac}$) |
|---|---|---|
| Normal (no fault) | 4.5 mV | 375 mV |
| Short to ground | 0 mV (a side) or 9 mV (b side) | 0 mV (a side) or 4.5 mV (b side) |
| Open fault | 750 mV | 750 mV |

When there is no fault on write head coil L, the calculated voltage $V_{ab}$ across nodes a and b is equal to 4.5 mV. When there is a short to ground on the node a side of write head coil L, the calculated voltage $V_{ab}$ is 0 mV. When there is a short to ground on the b node side of coil L, the calculated voltage $V_{ab}=9$ mV. If there is an open fault on coil L, the calculated voltage $V_{ab}$ is 750 mV. Similarly, the chart may be read and interpreted for the voltage $V_{ac}$ across nodes a and c.

Tables 2 and 3 are derived from the simulation calculation results of Table 1. Table 2 illustrates the monitoring and analysis of voltage $V_{ab}$ in accordance

TABLE 2

| Write head status | $V_{yx}$ ($V_{ab}$) |
|---|---|
| No open fault | <10 mV |
| Open fault | 750 mV | with the present invention to detect write head open faults. If voltage $V_{ab}$ is greater than a first threshold voltage, for example, 750 mV, an open fault is detected by write head fault detection circuit 30. If voltage $V_{ab}$ is less than a second threshold voltage, for example, 10 mV, then a normal write head status is detected. Because the value of voltage $V_{ab}$ is within the same range (4.5 mV and 0 mV or 9 mV) for a no-fault or short-to-ground condition, respectively, as shown in Table 1, $V_{ab}$ is preferably used for detecting an open fault so that only two detection levels are required on voltage $V_{ab}$. The actual values for the first and second threshold voltages are dependent on the component, voltage and current values of write head fault detection circuit 30; however, preferably the second threshold voltage is at least 10 times the order of magnitude of the first threshold voltage to insure accurate open fault detection.

Table 3 illustrates the monitoring and analysis of voltage $V_{ac}$ in accordance with the present invention to detect write head shorts to ground. If voltage $V_{ac}$ is

TABLE 3

| Write head status | $V_{yz}$ ($V_{ac}$) |
|---|---|
| Normal (no short to ground fault) | >350 mV |
| Short to ground | <10 mV | less than a third threshold voltage, for example, 10 mV, then a short to ground on the write head is detected by write head fault detection circuit 30. However, if voltage $V_{ac}$ is greater than a fourth threshold voltage, for example, 350 mV, the write head status is normal. Because the value of voltage $V_{ac}$ is within the same order (375 mV and 750 mV) for a no fault or short-to-ground condition, respectively, as shown in Table 1, $V_{ac}$ is preferably used for detecting a short-to-ground fault so that only two detection levels are required on voltage $V_{ac}$. The actual values for the third and fourth threshold voltages are dependent on the component, voltage and current values of write head fault detection circuit 30; however, preferably the second threshold voltage is at least 10 times the order of magnitude of the first threshold voltage to insure accurate short-to-ground write head fault detection.

By analyzing both voltages $V_{ab}$ and $V_{ac}$, the fault detection circuit 30 detects whether a write head fault is a short or an open fault. Preferably, voltage $V_{ab}$ is used for open fault detection, and voltage $V_{ac}$ is used for short fault detection, although other information may be obtained by analyzing both voltages $V_{ab}$ and $V_{ac}$, using multiple threshold levels, as illustrated in Table 1.

Figure 4:
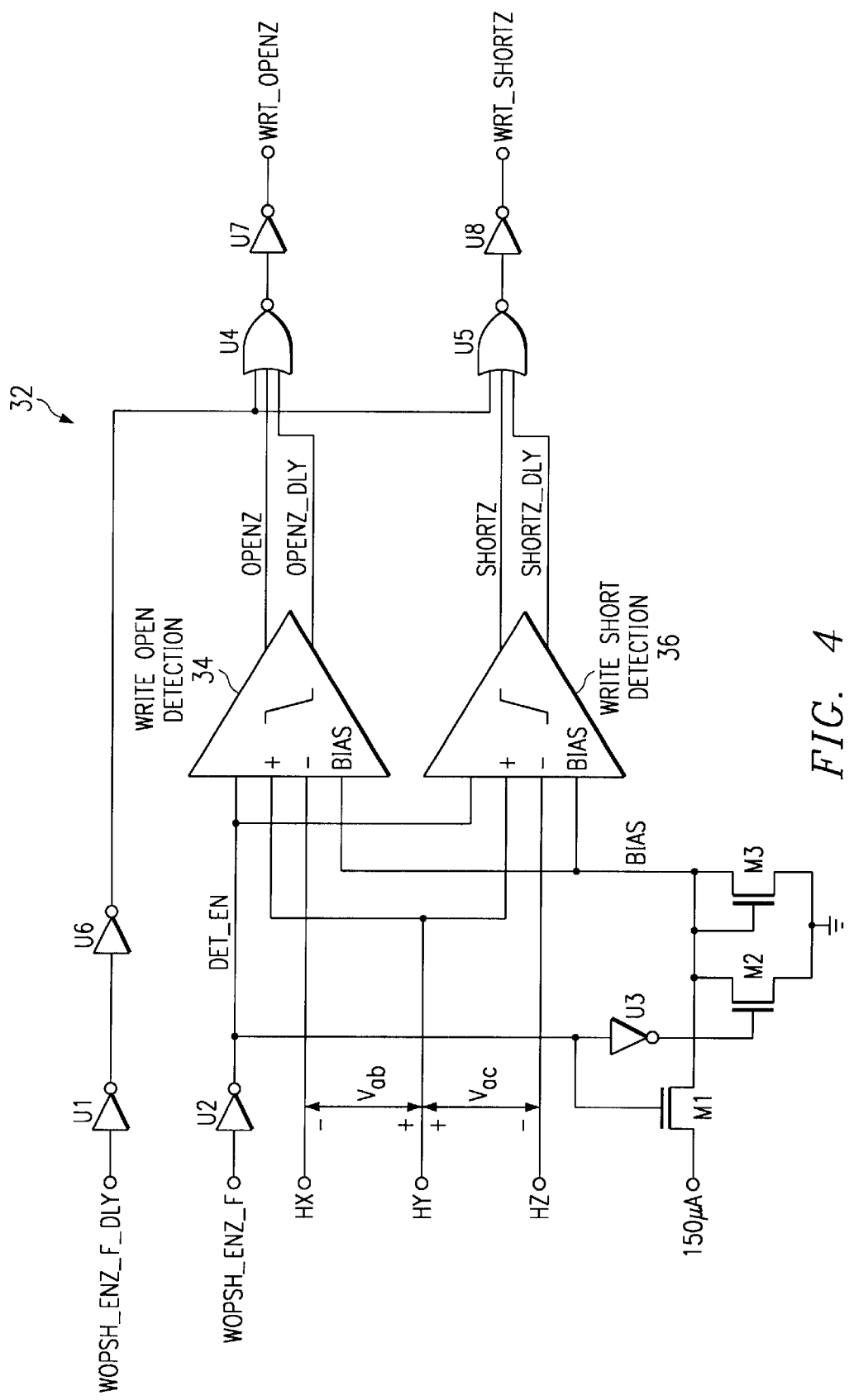
FIG. 4 shows a schematic diagram of the logic circuit of the present invention having two comparators for write open and short detection.
Figure 5:
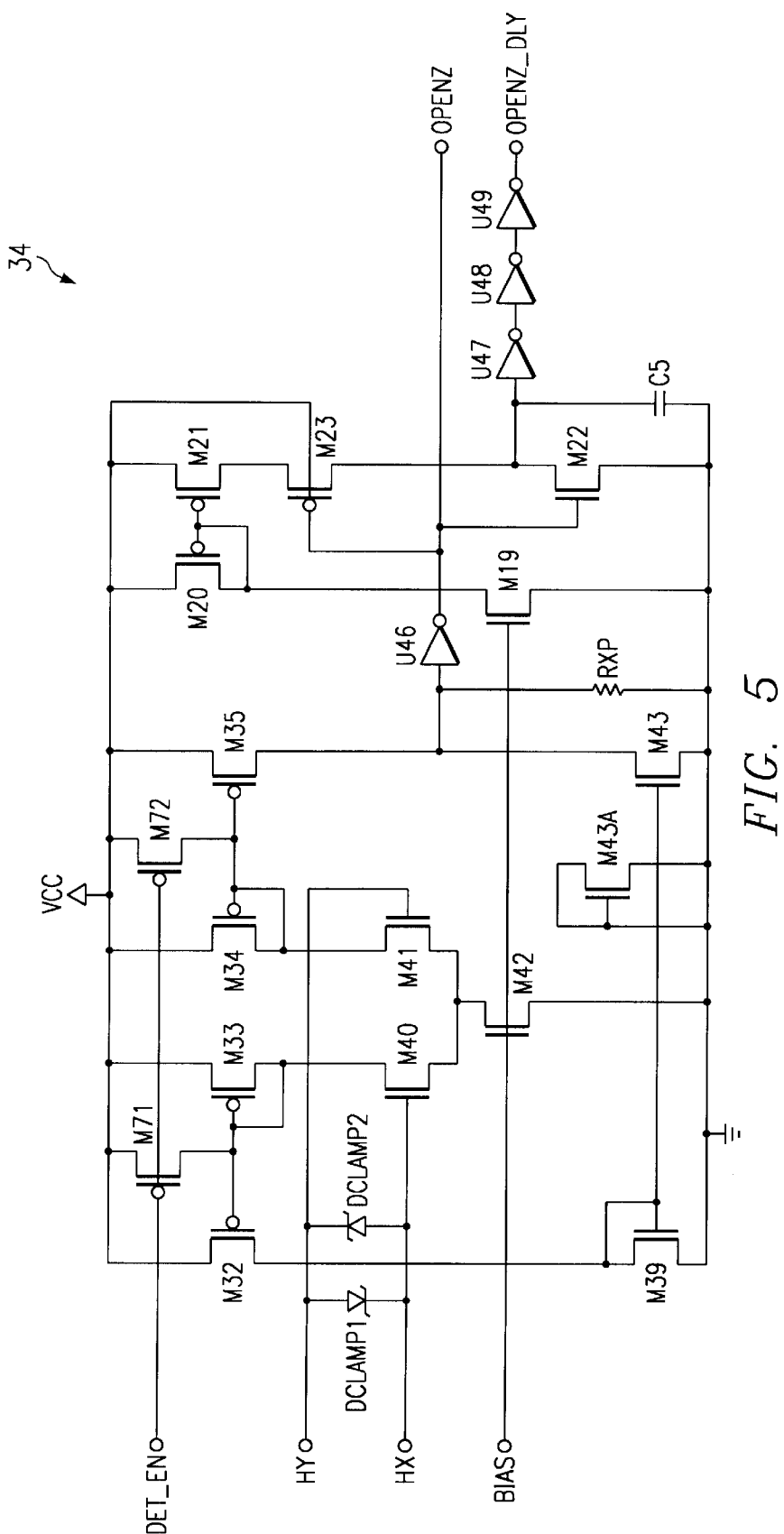
FIG. 5 shows a schematic diagram of the write open detection comparator of the logic circuit.
Figure 6:
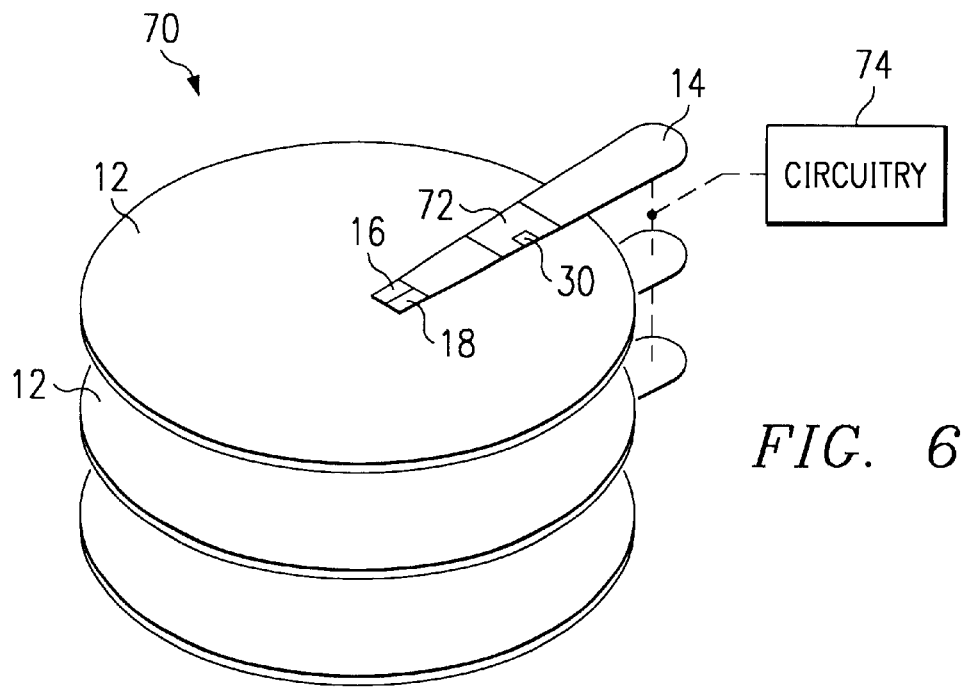
FIG. 6 illustrates the present invention implemented in a hard-disk drive system.

FIG. 4 shows a schematic for a voltage detection logic circuit 32 of the present invention, comprising a write open detection comparator 34 and write short detection comparator 36 coupled to nodes a (signal HY), b (signal HX) and c (signal HZ) for detecting and analyzing voltages $V_{ab}$ and $V_{ac}$. Schematic 32 is exemplary of a preferred embodiment of the present invention, although other logic circuit designs or software algorithms are anticipated. Signal write open/ short enable fault delay WOPSH_ENZ_F_DLY establishes a delay when the chip switches from write to read mode. This gives enough time for the writer circuit to settle down so that reliable and accurate detection can be done and no false faults will be reported. FIG. 5 shows a schematic of a preferred design for comparator 34, although other comparator designs are anticipated. Comparator 36 may comprise a similar architecture with different values for transistors M21, M22, and M23 at the output, for example. FIG. 6 illustrates a hard-disk drive system 70 having a preamplifier 72 including the write head fault detection circuit 30 or 40 of the present invention.

Simulation results indicate that there are no overshoot currents in the circuit design of the present invention.

Figure 7:
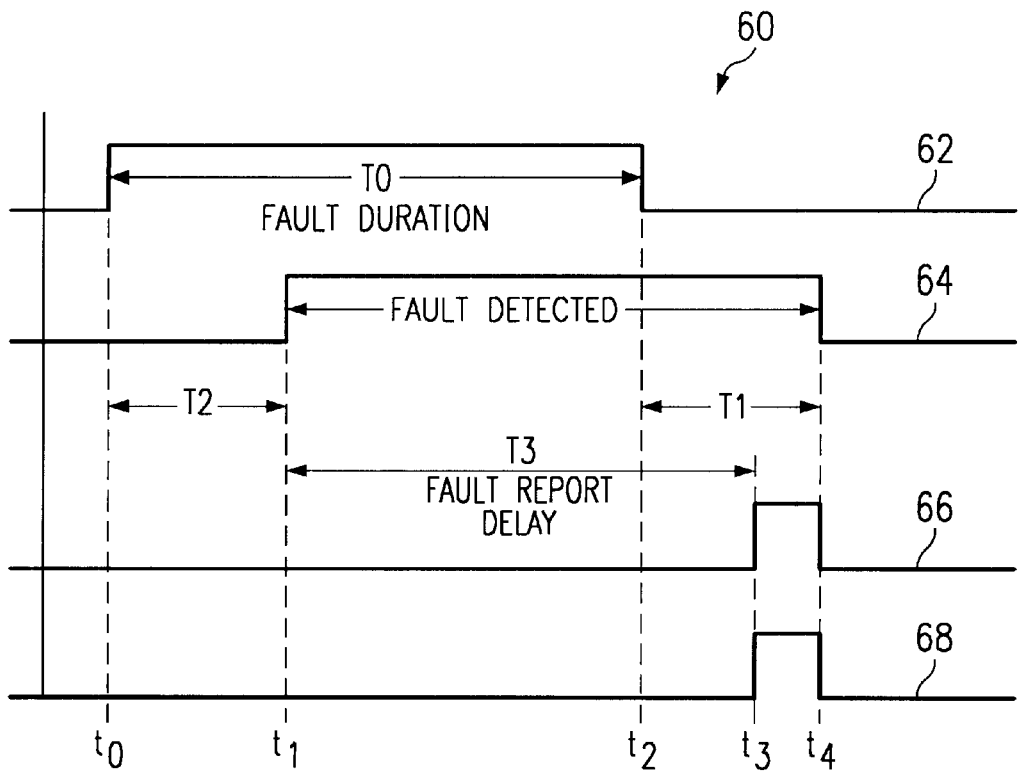
FIG. 7 shows a timing diagram for the fault detection function of write head fault circuit of the present invention.

Open and short comparators 34, 36 both have a bulit-in timer circuit to filter out short duration (for example, <150 nanoseconds) transient faults. The timing procedure is described below. FIG. 7 shows a timing diagram 60 for the write head fault detection circuit 30 of the present invention showing transient faults of the write head coil L. Signal 62 indicates the fault duration T0 lasting from time $t_0$ to $t_2$. The time period T2 from $t_0$ to $t_1$ indicates the detection time, or amount of time it takes for the write head fault detection circuit 30 to detect a fault on write head 18 coil L, which may be, for example 50 ns. Signal 64 indicates the time period during which a fault is detected, from time periods from $t_1$ to $t_4$. Time period T1 from $t_2$ to $t_4$ is the detection release time. Signal 66 indicates a fault detected delay signal of a predetermined time period. The detection delay time T3 is indicated by the time period between time $t_1$ and $t_3$, which is usually based on disk drive 70 system requirements and may be, for example, 150 to 200 nanoseconds. And signal 68 indicates a valid fault detection output, which indicates an open coil L or short coil L. The fault duration signal 62 must be long enough to be reported at the fault detection output, signal 68. This means that either:

$$T0+T1>T2+T3 \text{ or } T0>T2+T3-T1$$

in order for the fault detection circuit 30, 40 to report a fault output. For example, for a write open detection (normal, 70° C., ⅝ volts), T1=89.3 ns, T2=47.8 ns, T3=203 ns, and T0>162 ns. For a write short detection (normal, 70° C., ⅝ volts), T1=71.7 ns, T2=76.7 ns, T3=148 ns, and T0>153 ns.

The present invention provides a reliable, accurate means of detecting faults on a write head 18 of a hard-disk drive system 70. Rather than a dynamic fault detection during a write mode, a DC fault detection is performed during a quiet mode of the hard-disk drive 70 such as during the read mode. Errors in write head fault detection are avoide d by use of the present invention. Standard components are utilized that are inexpensive and easily implementable into electronic circuitry. Some pre-existing components may be used for the fault detection circuit 30, and few additional components are required. The invention is preferably implemented in a preamplifier circuit 72. The invention is advantageous in discriminating between an open or short fault of a write head, which is not possible with prior art fault detection circuits. The write head fault detection is frequency-independent because the detection is performed during a non-writing mode. Short duration transient faults are ignored by means of a timing delay, preventing fault detection when the write head hits the storage media platter 12 for a short period due to mechanical vibration, for example.

While the invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A circuit for detecting faults on a write head of a hard-disk drive, the write head having a coil, said circuit comprising:

a first resistor coupled to a first end of said coil at a node a;

a second resistor coupled to a second end of said coil at a node b; and a switch coupled to said first and second resistors at a common node c, wherein faults on said write head coil are detectable by analyzing the voltages across said nodes a, b and c.

2. The circuit according to claim 1 wherein an open fault is detectable by analyzing the voltage across nodes a and b, and wherein a short to ground is detectable by analyzing the voltage across nodes a and c.

3. The circuit according to claim 2 further comprising a logic circuit coupled to said a, b and c nodes detecting said write head faults.

4. The circuit according to claim 3 wherein said logic circuit comprises a write head open detection comparator and a write short detection comparator.

5. The circuit according to claim 3 wherein a first predetermined DC current is input into node a, wherein an open fault is detected on said write head coil by said logic circuit when the voltage across nodes a and b reaches a first threshold voltage, wherein a write head normal condition is detected when the voltage across nodes a and b is less than a second threshold voltage, wherein said first threshold voltage is at least 10 times said second threshold voltage.

6. The circuit according to claim 3 wherein a short fault on the write head coil is detected by said logic circuit when the voltage across said nodes a and c is less than a third threshold voltage, wherein a write head normal condition is detected when the voltage across said nodes a and c is greater than a fourth threshold voltage, wherein said fourth threshold voltage is at least 10 times greater than said third threshold voltage.

7. The circuit according to claim 3 wherein said first and second resistors have equal values, wherein said switch comprises a transistor, wherein the gate of said transistor is coupled to a voltage source, wherein said transistor is adapted to selectively couple said node c to ground.

8. A circuit for detecting faults on a write head of a hard-disk drive, the write head having a coil, said circuit including a preamplifier circuit comprising:

a first resistor coupled to a first end of said coil at a node a;

a second resistor coupled to a second end of said coil at a node b; and a switch coupled to said first and second resistors at a node c, wherein faults on said write head coil are detectable by analyzing the voltages across said nodes a, b and c.

9. The circuit according to claim 8 wherein an open fault is detectable by analyzing the voltage across nodes a and b, and wherein a short to ground is detectable by analyzing the voltage across nodes a and c.

10. The preamplifier circuit according to claim 9 wherein said first and second resistors have equal values, wherein said switch comprises a transistor, wherein the gate of said transistor is coupled to a voltage source, wherein said transistor is adapted to selectively couple said node c to ground.

11. The preamplifier circuit according to claim 9 further comprising a logic circuit coupled to said a, b and c nodes detecting said write head faults.

12. The preamplifier circuit according to claim 11 wherein said logic circuit comprises a write head open detection comparator and a write short detection comparator.

13. The preamplifier circuit according to claim 9 wherein a first predetermined DC current is input into node a, wherein an open fault is detected on said write head coil by said logic circuit when the voltage across nodes a and b reaches a first threshold voltage, wherein a write head normal condition is detected when the voltage across nodes a and b is less than a second threshold voltage, wherein said first threshold voltage is at least 10 times said second threshold voltage.

14. The preamplifier circuit of claim 9 wherein a short fault on the write head coil is detected by said logic circuit when the voltage across said nodes a and c is less than a third threshold voltage, wherein a write head normal condition is detected when the voltage across said nodes a and c is greater than a fourth threshold voltage, wherein said fourth threshold voltage is at least 10 times greater than said third threshold voltage.

15. The preamplifier circuit of claim 8 wherein said fault detection is performed during a quiet mode of the hard-disk drive.

16. A method of detecting faults on a write head of a hard-disk drive, said write head including a coil, comprising the steps of:

coupling a first end of said coil to a first resistor at a node a;

coupling a second end of said coil to a second resistor at a node b;

coupling a switch to said first and second resistors at a common node c; and detecting faults of said coil by analyzing the voltages across nodes a and b or nodes a and c.

17. The method according to claim 16 wherein said detecting step is performed during a quiet mode of said hard-disk drive.

18. The method according to claim 16 further comprising the steps of:

detecting said faults with a logic circuit;

applying a predetermined DC current to said node a; and closing said switch, wherein said first and second resistors have equal values.

19. The method according to claim 18, wherein an open fault on the write head coil is detected when the voltage across nodes a and b reaches a first threshold voltage, wherein a write head normal condition is detected when the voltage across nodes a and b is less than a second threshold voltage, wherein said first threshold voltage is at least 10 times said second threshold voltage.

20. The method according to claim 18, wherein a short fault on the write head coil is detected by said logic circuit when the voltage across said nodes a and c is less than a third threshold voltage, wherein a write head normal condition is detected when the voltage across said nodes a and c is greater than a fourth threshold voltage, wherein said fourth threshold voltage is at least 10 times greater than said third threshold voltage.

21. The method according to claim 16, further comprising the step of:

delaying the fault detection step by a predetermined time period to prevent detection of transient faults.

* * * * *